(12) United States Patent
Lue-Sang et al.

(10) Patent No.: US 9,875,150 B2
(45) Date of Patent: Jan. 23, 2018

(54) METHOD AND SYSTEM FOR PROCESSING NOTIFICATIONS AMONGST APPLICATIONS OF A DATA PROCESSING SYSTEM

(71) Applicant: Apple Inc., Cupertino, CA (US)

(72) Inventors: Ronald D. Lue-Sang, Union City, CA (US); Megan M. Gardner, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 14/728,614

(22) Filed: Jun. 2, 2015

(65) Prior Publication Data

US 2016/0360004 A1 Dec. 8, 2016

(51) Int. Cl.
*G06F 15/16* (2006.01)
*G06F 9/54* (2006.01)

(52) U.S. Cl.
CPC ..................................... *G06F 9/54* (2013.01)

(58) Field of Classification Search
USPC ................. 709/219, 201, 202, 223
See application file for complete search history.

(56) References Cited

U.S. PATENT DOCUMENTS

| | | | |
|---|---|---|---|
| 7,784,065 B2 | 8/2010 | Polivy et al. | |
| 8,181,124 B2 | 5/2012 | Ebert et al. | |
| 2007/0165615 A1* | 7/2007 | Shin | G06F 9/542 370/356 |
| 2007/0283364 A1 | 12/2007 | Deininger et al. | |
| 2010/0058363 A1 | 3/2010 | Brun et al. | |
| 2011/0055754 A1* | 3/2011 | Nicholas, III | G06F 3/0481 715/810 |
| 2015/0347749 A1* | 12/2015 | Kiehtreiber | G06F 21/53 726/26 |
| 2015/0350885 A1* | 12/2015 | Stanley-Marbell | H04W 8/22 455/418 |
| 2016/0026442 A1* | 1/2016 | Chhaparia | G06F 9/45508 717/139 |
| 2016/0164986 A1* | 6/2016 | Chen | G06F 3/0488 715/753 |
| 2016/0180344 A1* | 6/2016 | Studnicka | G06Q 20/20 705/44 |

* cited by examiner

*Primary Examiner* — Lan-Dai T Truong
(74) *Attorney, Agent, or Firm* — Blakely, Sokoloff, Taylor & Zafman LLP

(57) ABSTRACT

An application manager of an operating system running within a data processing system receives a request from a first daemon via a first application programming interface (API) to present a notification message to a user. In response, the application manager identifies a first of a plurality of applications that have been installed within the operating system based on a unique identifier extracted from the request. The application manager communicates, via a second API, with the first application to obtain a first view controller handle of a first view controller associated with the first application. The application manager invokes, via the first view controller handle, the first view controller to display the notification message obtained from the request. The first view controller is configured to display the notification message in a manner configured by the first application on a display device associated with a data processing system.

19 Claims, 6 Drawing Sheets

US 9,875,150 B2

METHOD AND SYSTEM FOR PROCESSING NOTIFICATIONS AMONGST APPLICATIONS OF A DATA PROCESSING SYSTEM

FIELD OF THE INVENTION

Embodiments of the present invention relate generally to data processing systems. More particularly, embodiments of the invention relate to managing notifications amongst applications running within a data processing system.

BACKGROUND

Streaming of content generally refers to multimedia content that is constantly transmitted from a server device and received by a client device. The content is usually presented to an end-user while it is being delivered by the streaming server. The name refers to the delivery method of the medium rather than to the medium itself.

Current streaming services generally require specialized servers to distribute "live" content to set-top boxes of end users. Special software running with a set-top box (e.g., Apple TV™ box) is configured to play the media content (e.g., movie, a television or TV program) that is streamed from a content provider server (e.g., Netflix® or Hulu®). Similar to a mobile application, such special software may be an application that is developed by a software developer associated with the content provider and distributed by another server associated with a device provider of the set-top box (e.g., iTunes™ from Apple Inc.®).

During the operations, there are some notification messages to be presented to a user of an end user device. Such notification messages may be specifically presented in a manner specified by a corresponding software component. In a conventional system, a launching logic responsible to launch certain software components bears the responsibility of how to present the notification messages to the user. Such a requirement tends to cause the launching logic to be more complex, especially on updating or modifying the manner to present the notification messages.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
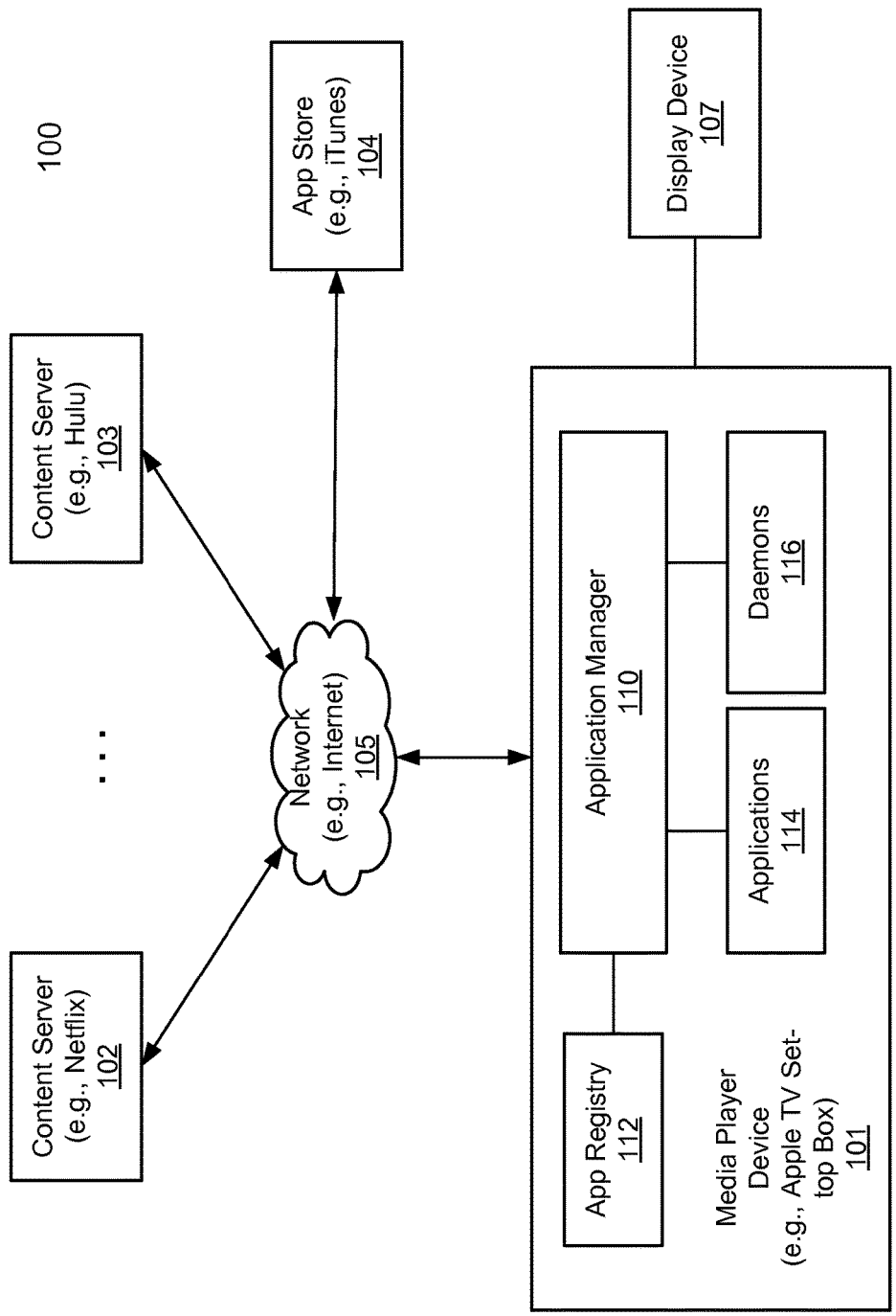
FIG. 1 is a block diagram illustrating a system for managing notification messages according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, instead of having a centralized launching logic to render and present a notification message, a communication mechanism is provided to allow a source of the notification message (e.g., a game daemon) to invoke, via the communication mechanism, another application (e.g., a gaming application) that is capable of presenting the notification message to render and present the notification message to a user in a specific manner that is known to and/or specified by the application. For example, in an online gaming situation, a notification message is often delivered amongst the game participants as end users. A game daemon that coordinates the games running within a data processing system can invoke a gaming application to render and present the notification message in a manner that is specifically tailored to a specific gaming situation at the point in time. The gaming application may be provided by a game developer as a client application for participating in the game. Such a gaming application knows how to render and present a notification under a specific gaming situation. As a result, an operating system that hosts the game would not have to know exactly how to present the notification messages and the operating system is decoupled from rendering and presenting or displaying the notification messages.

According to one embodiment, an application manager running within an operating system is configured to coordinate the communications between a source or producer of a notification message and a presenter or consumer of the notification message. The presenter associated with the notification message is identified and invoked by the application manager to render and present the notification message. As a result, the application manager does not need to know how to render and present notification messages initiated from a variety of sources, as the application manager manages many applications that may issue notification messages. Such architecture enables the corresponding applications as experts to handle their respective notifications in their own manners.

In one embodiment, when a request for presenting a notification message is received from a daemon via a first application programming interface (API), an application manager identifies one of the applications that have been installed in the system. The identified application may be associated with the requested notification message and capable of presenting the notification message in a specific manner. The application may be identified by a unique identifier that is extracted from the request received from the daemon (e.g., source). The application may be provided by a content provider (e.g., Netflix®, Hulu®) providing media content that can be downloaded or streamed to a user device. The application manager launches the identified application if the application is not running and communicates via a second API with the application requesting rendering and presenting a notification message.

In return, in one embodiment, the application manager receives a view controller handle or a view controller object representing a view controller or view controller instance (e.g., a graphical user interface or GUI presentation object) from the application. The view controller may be created by the application that is responsible for rendering and displaying content as a GUI view at a display device, for example, by sending the content and proper graphics commands to a graphics subsystem of the data processing system. The view controller is configured to display the notification message in a manner configured by the application on a display device associated with a data processing system. In one embodiment, view controller and/or the application controls the timing of presenting the notification message. Once the notification message has been presented, the application manager receives a result or status of presenting the notification message from the view controller and/or the application. The application manager then notifies the source of the notification message.

FIG. 1 is a block diagram illustrating a system for managing notification messages according to one embodiment of the invention. Referring to FIG. 1, system 100 includes media player device 101 communicatively coupled to content servers 102-103 and app store server 104 over network 105. Content servers 102-103 may be associated with a variety of content providers, such as Netflix® and Hulu®, etc., which provide content (e.g., movies, songs, images) to be streamed over network 105 and rendered and played at media player device 101. Network 105 may be a variety of networks, such as local area network (LAN), wide area network (LAN), or a combination thereof. Media player device 101 can be a variety of electronic devices, appliance devices, or data processing systems that are capable of accessing network 105. For example, media player device 101 may be a desktop (e.g., iMac™), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a gaming device, a set-top box (e.g., Apple TV™ box), or a combination thereof.

In one embodiment, media player device 101 includes an application manager 110, which is executed by processing resources (e.g., memory, processor(s)), to manage applications 114 and daemons 116 that are running within media player device 101. Processing resources may present one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

Application manager 110 and/or daemon 116 may be a part of an operating system (OS) running and executed by the processing resources within the system. An operating system is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition, an operating system may further include other core components, such as a scheduler, a device manager, a kernel, etc. In order not to unnecessarily obscure embodiments of the present invention, these components are not shown herein. An operating system may be any kind of operating systems, such as, for example, iOS™ from Apple®, Android™ from Google®, Windows™ from Microsoft®, or other operating systems (e.g., UNIX, LINUX, real-time or embedded operating systems).

Referring back to FIG. 1, applications 114 may be provided by a variety of content providers, such as, for example, Netflix®, Hulu®. Applications 114 are used to access (e.g., browse, download, and/or stream) content (e.g., video clips or movies, audio clips or songs, video games, photos) from a corresponding content server (e.g., servers 102-104), which may be presented at a media user interface (e.g., display, audio jack, or both, not shown) of media player device 101. Display device 107 may be coupled to media player device 101 internally or locally, via an interconnect (e.g., a high definition multimedia interface or HDMI cable), or via a wireless connection. Application 114 may be as part of application bundles downloaded from a content distribution server such as server 104.

For example, a user of media player device 101 can launch a client application that is provided by a content provider (e.g., Netflix®) and has been downloaded from an App store (e.g., iTunes) and installed within media player device 101. Through the client application, the user can access content (e.g., menus or items of movies, songs, or video games) from the corresponding content server (e.g., content servers 102-103) to select, subscribe, and/or purchase media content. The selected media content can then be streamed over network 105 to media player device 101. The media content can be rendered by a content rendering framework (not shown) of media player device 101 and presented at a user interface device, such as display device 107.

According to one embodiment, dependent upon the specific types of media content to be streamed and rendered, one of daemons 116 is selected and configured to coordinate and manage the communications between presenting the media content and user interactions with the presented media content. One of the communications is related to notification messages that a daemon wants to present or display to a user. For example, a game daemon configured to handle online gaming situations may want to display a notification message (which may be received from another remote user as a game participant) to a local user of media player device 101. Typically in a conventional system, it would require application manager 110 to handle all of the necessary tasks of rendering and presenting the notification messages. As application manager 110 manages a growing number of applications and each of the applications may have a different way to present notification messages, it tends to make application manager 110 more complex and difficult to maintain or upgrade.

According to one embodiment, application manager 110 coordinates communications between a source or producer of a notification message and a target or consumer of the notification message via a proper set of APIs. In one embodiment, when a source or producer (e.g., a game daemon) wants to send a notification message to be presented to a user of media player device 101, it sends the notification message to application manager 110. In response, application manager 110 identifies an application as a target or consumer that is capable of rendering and presenting the notification message. Application manager 110 then invokes the identified application to present the notification message. Once the notification message has been presented, application manager 110 will receives a result and/or status from the application. Application manager 110 then relays the result or status back to the source. As a result, application manager 110 does not need to know the details regarding how to render and present notification messages. Rather, it is up to the corresponding applications, which may be provided by the corresponding content providers, to render and present the notification messages in a specific way they prefer.

Figure 2:
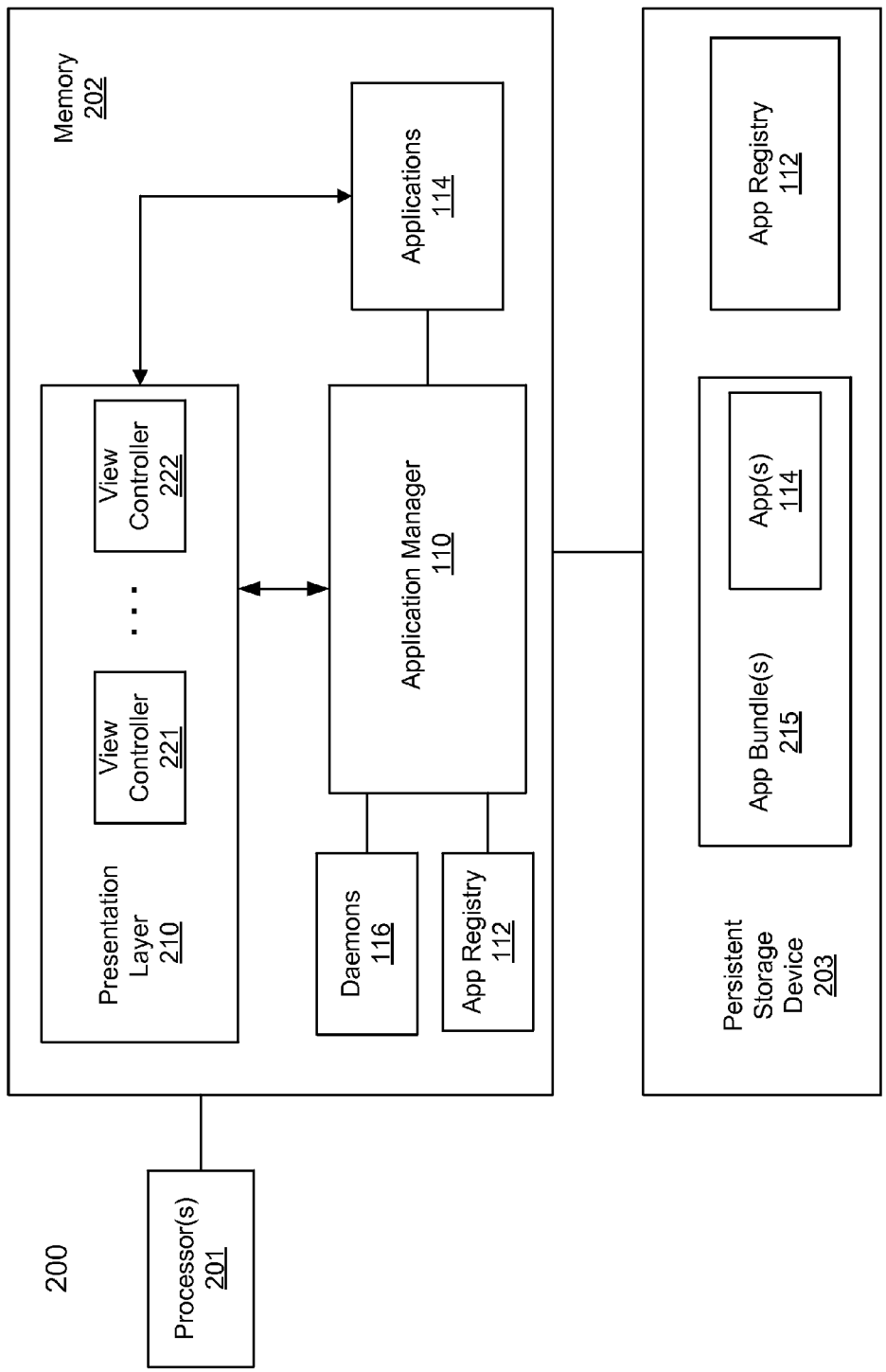
FIG. 2 is a block diagram illustrating an example of a media player device according to one embodiment of the invention.

FIG. 2 is a block diagram illustrating an example of a media player device according to one embodiment of the invention. Media player device 200 may represent at least a portion of media player device 101 of FIG. 1. Referring to FIG. 2, device 200 includes, but is not limited to, one or more processors 201, memory 202, and persistent storage device 203 (e.g., hard disks). Storage device 203 stores application bundles such as application bundle 215 downloaded from a content distribution server (e.g., iTunes) such as server 104 of FIG. 1, application registry 112, and other software (e.g., operating system, application manager 110).

In one embodiment, application manager 110 is loaded in memory 202 and executed by processor(s) 201. Application manage 110 may be a part of application launching logic (e.g., Springboard of iOS) responsible for launching and terminating applications. When daemon 116 sends a notification message to be presented to a user, it sends a request (e.g., a first request) for presenting the notification message via a first API to application manager 110. In response to the request, application manager 110 identifies one of applications 114 that is capable of rendering and presenting the notification message requested. In one embodiment, application manager 110 looks up in application registry 112 based on a unique identifier (ID) specified by the request.

Figure 3:
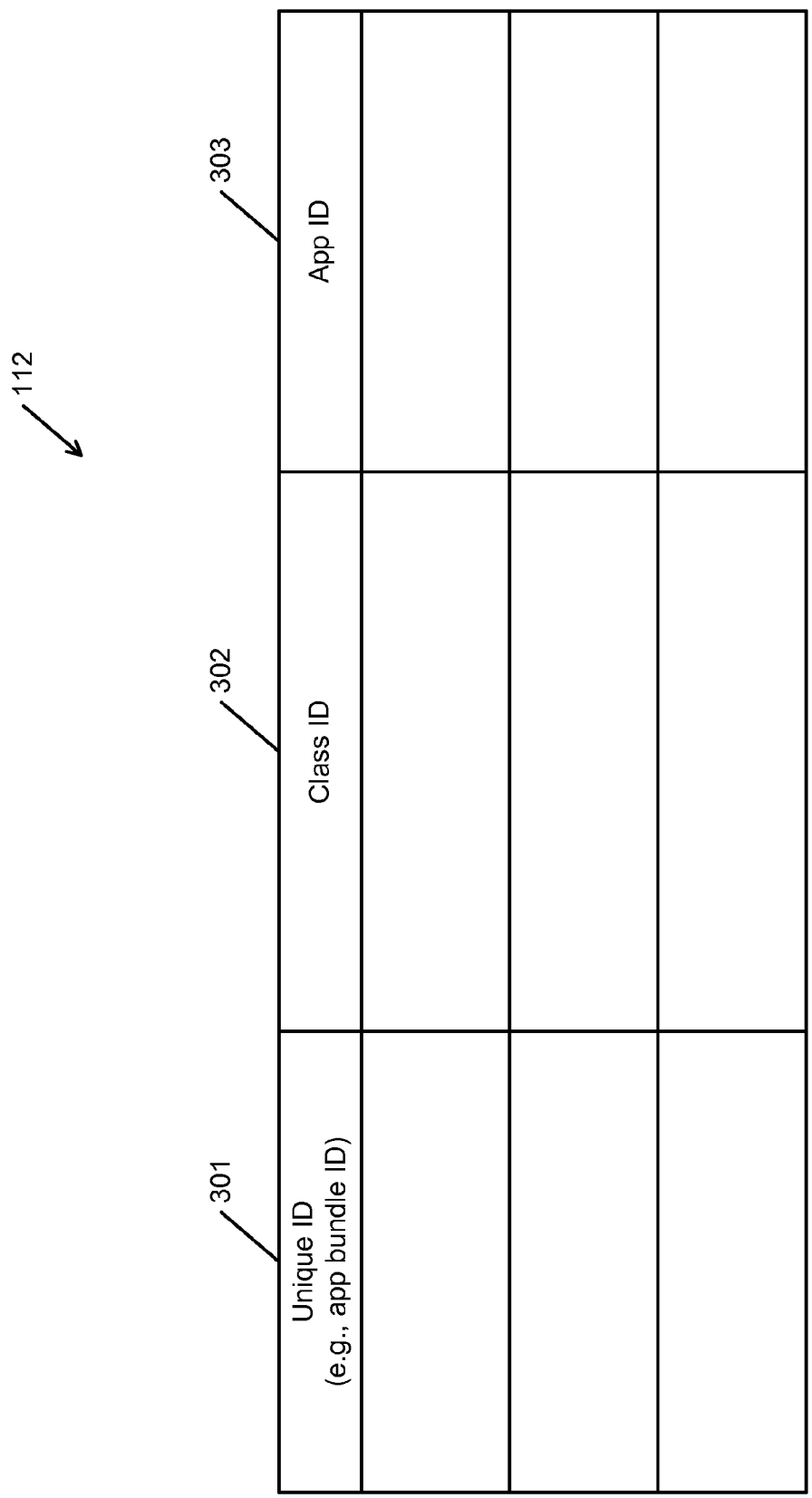
FIG. 3 is a block diagram illustrating an example of an application registry according to one embodiment of the invention.

FIG. 3 is a block diagram illustrating an example of an application registry according to one embodiment of the invention. Referring to FIG. 3, application registry 112 includes multiple entries, each corresponding to one of applications 114 that have been installed and registered within media player device 200. Each entry maps an application ID 303 to a unique ID 301. In one embodiment, unique ID 301 may be part of an application bundle ID representing an application bundle (e.g., application bundles 215 of FIG. 2). If an application bundle includes multiple applications, the corresponding entry may include an optional class ID 302 that identifies a type of the corresponding application. Thus, application registry 112 may include multiple entries for a particular application bundle that has multiple types of applications therein.

Referring now to FIGS. 2-3, based on a unique ID obtained from the request, application manager 110 looks up based on unique ID 301 to locate a matching entry and to retrieve the corresponding application ID 303. If the application identified by application ID 303 has not been launched, application manager 110 will launch the application as one of applications 114. If the application bundle identified by unique ID 301 includes multiple applications, application manager 110 may further match class ID 302 to identify the matching entry, where the class ID 302 may also be specified and extracted from the request. Application manager 110 then sends another request (e.g., a second request) to the application via a second API, where the request includes a notification message that is received from daemon 116 (e.g., source) and proper information or command to request the application to render and present the notification message.

In one embodiment, in response to invoking the application via a second API, application manager 110 receives a handle of a view controller (e.g., view controllers 221-222 managed by presentation layer 210) to render and present information on a graphical user interface (not shown). The view controller may be allocated or created by the application. Application manager 110 then instructs the view controller via a corresponding view controller handle (e.g., view controller object or view controller instance) to present the notification message. The view controller then renders and presents the notification message on a display. As described above, the view controller and/or the associated application are responsible to render and control the timing of notification message. Once the notification message has been presented, the application notifies application manager 110 regarding the status or result of presenting the notification message. In response, application manager 110 in turn notifies the source of the notification message, i.e., daemon 116.

Figure 4:
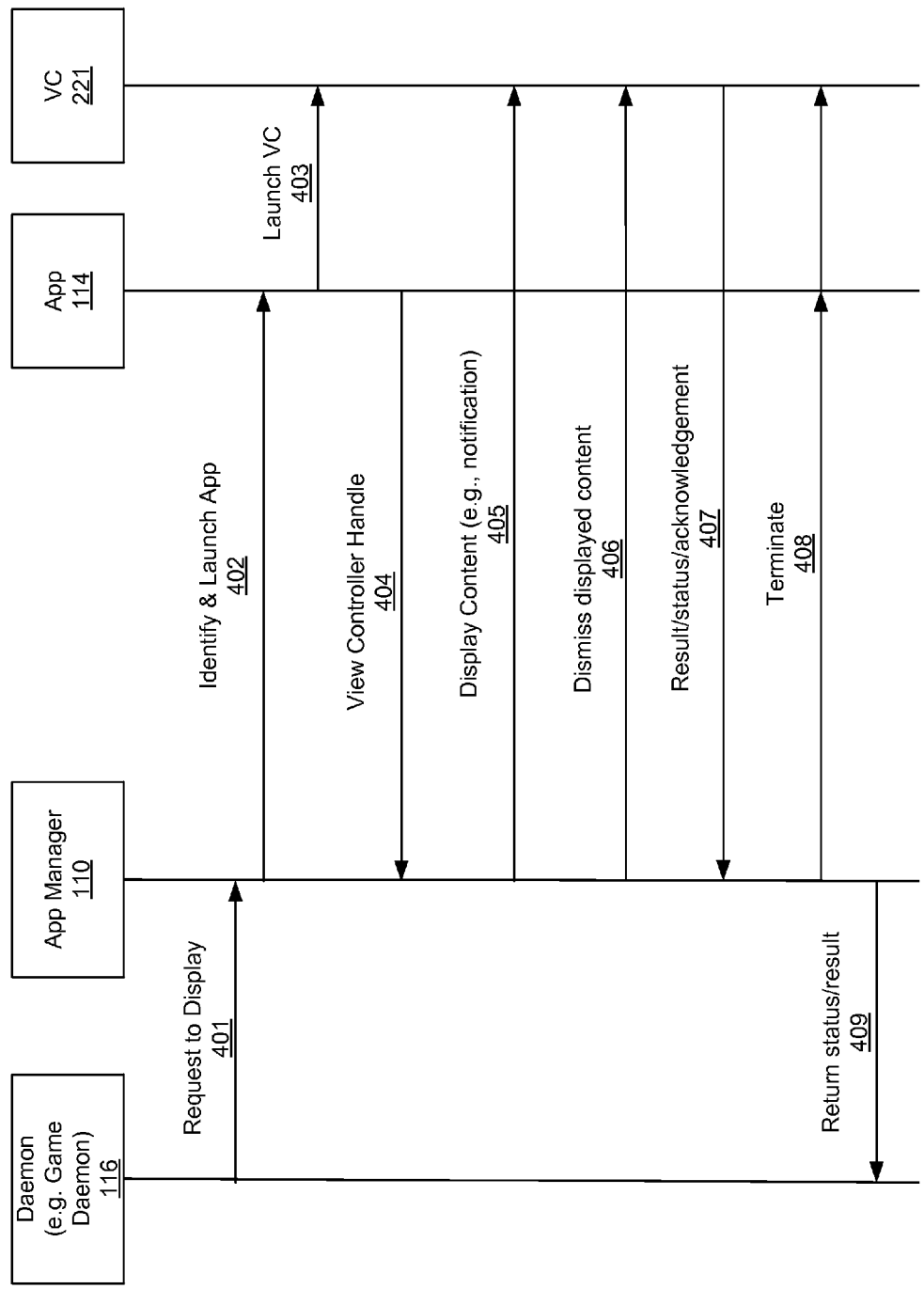
FIG. 4 is a transaction diagram illustrating certain transactions of a media player device according to one embodiment of the invention.

FIG. 4 is a transaction diagram illustrating certain transactions of a media player device according to one embodiment of the invention. Referring to FIG. 4, when a source or producer of a notification message, in this example, daemon 116, likes to send the notification message to a user, daemon 116 sends a request to present the notification to application manager 110 via transaction 401. In response, application manager 110 looks up in the application registry to identify an application as a target or consumer that is capable of consuming the notification message based on the request. Application manager 110 may launch the identified application and communicates with the application via transaction 402 requesting the application to render and present the notification.

In response, application 114 creates or launches view controller 221 if it has not been launched via transaction 403. Application 114 returns a handle of view controller 221 back to application manager 110 via transaction 404. Using the view controller handle received from application 114, application manager 110 can instruct view controller 221 to render and present the notification message to a graphical user interface via transaction 405. For example, the handle of view controller 221 may be a handle of a view controller object or class representing view controller 221. Application manager 110 can invoke a function member of the view controller object by passing content of the notification message to the function member to allow the view controller object to render and present the content of the notification.

As described above, application 114 is responsible for creating and managing view controller 221, where view controller 221 renders and presents the content in a specific or customized manner. Application 114 can also control timing of presenting the notification by communicating with view controller 221. Once the notification has been rendered and presented, subsequently, in response to a user action (e.g., activate, decline or cancellation action received from a user interface device such as a remote control) or timeout, application manager 110 instructs view controller 221 to dismiss the displayed content via transaction 406. In response, view controller 221 dismisses the displayed content and returns a status or result of such an action back to application manager 110 via transaction 407. In response, application manager 110 terminates or instructs application 114 to terminate view controller 221 via transaction 408. Application manager 110 also in turn notifies the source of the notification message, i.e., daemon 116 in this example, via transaction 409.

For example, a user may click or activate a cancel button displayed and such a user action is captured by an input device, such as a keyboard or remote control. The input device transmits a signal to application manager 110 indicating the user action. Furthermore, according to another embodiment, after a predetermined period of time during which no user action or callback from application 114 and/or view controller 221 is received, application manager 110 may terminate or cause application 114 to terminate view controller 221 and notify daemon 116 accordingly. Other configurations may exist, which may be configured as a set of rules.

Figure 5:
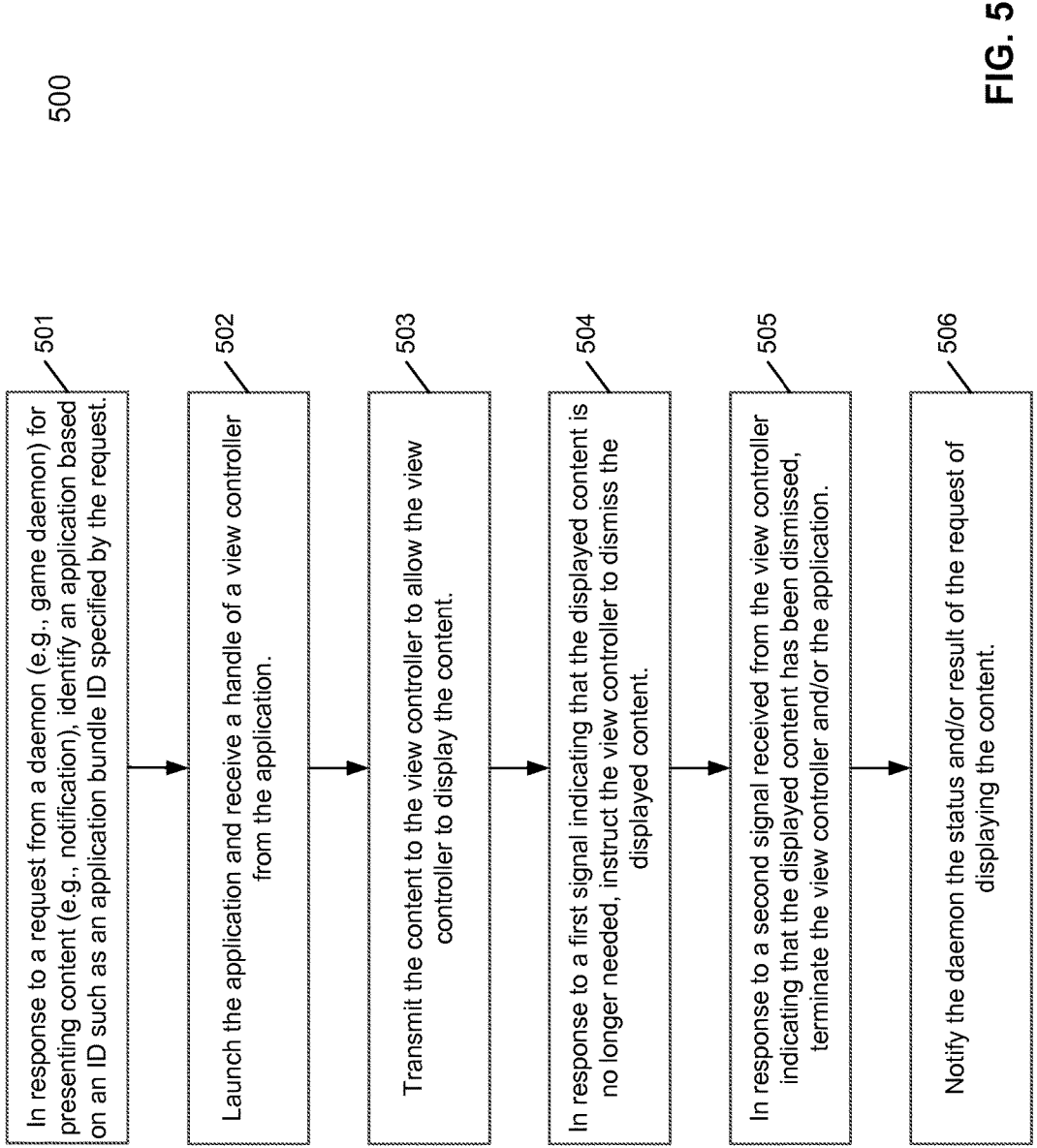
FIG. 5 is a flow diagram illustrating a process of managing notification messages according to one embodiment of the invention.

FIG. 5 is a flow diagram illustrating a process of managing notification messages according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by application manager 110 of FIG. 1. Referring to FIG. 5, at block 501, in response to a request received from a daemon (e.g., game daemon) as a source or message producer requesting for presenting a notification message to a user, processing logic identifies an application as a target or a message consumer based on an ID (e.g., application bundle ID) specified by the request. The identified application is capable of rendering and presenting the notification message. At block 502, processing logic launches the application (if it is not running) and communicates with the application to receive a handle of a view controller. Processing logic may send a request to the application for the purpose of presenting a notification message. In return, processing logic receives a handle of a view controller object or instance. At block 503, processing logic sends the content of the notification message to the view controller to allow the view controller to render and present the content in a graphical user interface. In response to a first signal indicating that the displayed content is no longer needed (e.g., job completes, user action, timeout), at block 504, processing logic instructs the view controller to dismiss the displayed content. In response to a second signal received from the view controller indicating that the displayed content has been dismissed, at block 505, processing logic terminates or cause the application to terminate the view controller. At block 506, processing logic notifies the source the status or result of the request of rendering and presenting the notification message.

Note that some or all of the components as shown and described above (e.g., application manager 110 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
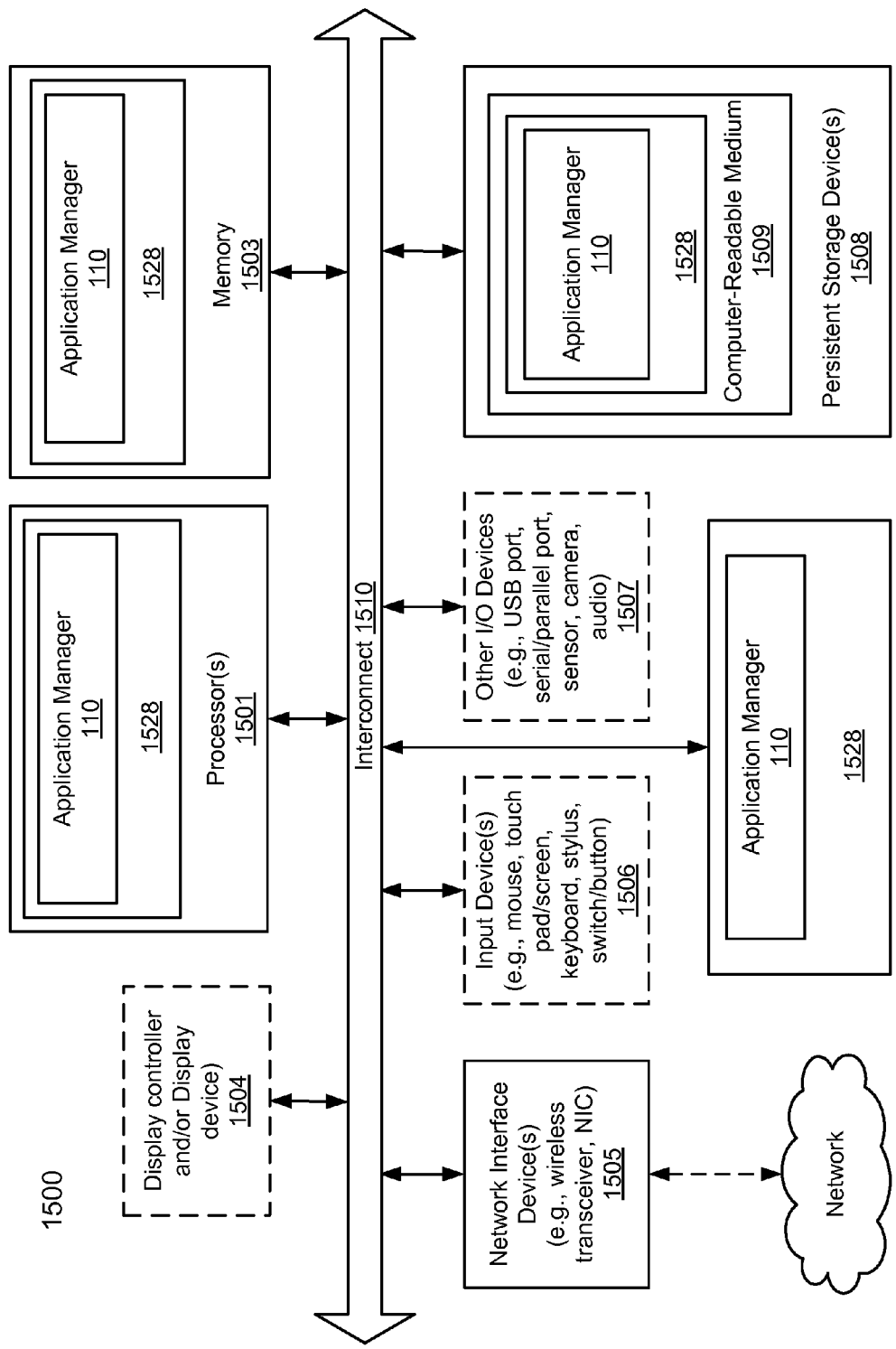
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, application manager 110 of FIG. 1. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine-readable medium having executable instructions stored therein, which when executed by a processor, cause the processor to perform a method for managing notifications of applications of a data processing system, the method comprising:
   receiving, at an application manager of an operating system running within the data processing system, a request from a first daemon via a first application programming interface (API) to present a notification message to a user of the data processing system;
   identifying by the application manager a first of a plurality of applications that have been installed within the operating system based on a unique identifier extracted from the request;
   communicating, via a second API, with the first application to obtain a first view controller handle of a first view controller associated with the first application;
   invoking, via the first view controller handle, the first view controller to display the notification message obtained from the request, wherein the first view controller is configured to display the notification message in a manner configured by the first application on a display device associated with the data processing system;
   receiving by the application manager a callback via the second API with a first status from the first application indicating that the notification message has been displayed;
   transmitting the first status to the first daemon via the first API; and
   causing the view controller to be terminated.

2. The non-transitory machine-readable medium of claim 1, wherein the method further comprises:
   receiving by the application manager a user input from a second daemon associated with an input device of the data processing system, the user input indicating that a cancellation has been received from the user; and
   transmitting a second status to the first daemon via the first API indicating that the notification message has been presented and the user has issued a cancellation.

3. The non-transitory machine-readable medium of claim 1, wherein the method further comprises:
   detecting by the application manager a predetermined period of time lapses during which no user input has been received; and
   transmitting a third status to the first daemon via the first API indicating that the notification message has been presented and no user input has been received with respect to the presented notification message.

4. The non-transitory machine-readable medium of claim 1, wherein identifying the first application from the plurality of applications comprises:
   performing a lookup operation in an application registry based on the unique identifier, wherein the application registry includes a plurality of entries, each entry corresponding one of the plurality of applications that have been installed within the operating system; and
   retrieving an application identifier from one of the entries that matches the unique identifier, wherein the retrieved application identifier is used by the application manager to communicate with the first application.

5. The non-transitory machine-readable medium of claim 1, wherein the first application is part of an application bundle downloaded from an application store over a network and installed within the operating system, and wherein the unique identifier is a bundle identifier that uniquely identifies the application bundle.

6. The non-transitory machine-readable medium of claim 5, wherein the first application is provided by a first content provider, and wherein the first application is configured to render media content streamed from a content server associated with the first content provider to be presented to the display device.

7. The non-transitory machine-readable medium of claim 5, wherein the application bundle includes the first application and a second application, wherein the request further includes a class identifier that identifies one of the first application and the second application, and wherein the first application is identified based on the unique identifier and the class identifier.

8. A computer-implemented method for managing notifications of applications of a data processing system, the method comprising:
receiving, at an application manager of an operating system running within a data processing system, a request from a first daemon via a first application programming interface (API) to present a notification message to a user of the data processing system;
identifying by the application manager a first of a plurality of applications that have been installed within the operating system based on a unique identifier extracted from the request;
communicating, via a second API, with the first application to obtain a first view controller handle of a first view controller associated with the first application;
invoking, via the first view controller handle, the first view controller to display the notification message obtained from the request, wherein the first view controller is configured to display the notification message in a manner configured by the first application on a display device associated with the data processing system;
receiving by the application manager a callback via the second API with a first status from the first application indicating that the notification message has been displayed;
transmitting the first status to the first daemon via the first API; and
causing the view controller to be terminated.

9. The method of claim 8, further comprising:
receiving by the application manager a user input from a second daemon associated with an input device of the data processing system, the user input indicating that a cancellation has been received from the user; and
transmitting a second status to the first daemon via the first API indicating that the notification message has been presented and the user has issued a cancellation.

10. The method of claim 8, further comprising:
detecting by the application manager a predetermined period of time lapses during which no user input has been received; and
transmitting a third status to the first daemon via the first API indicating that the notification message has been presented and no user input has been received with respect to the presented notification message.

11. The method of claim 8, wherein identifying the first application from the plurality of applications comprises:
performing a lookup operation in an application registry based on the unique identifier, wherein the application registry includes a plurality of entries, each entry corresponding one of the plurality of applications that have been installed within the operating system; and
retrieving an application identifier from one of the entries that matches the unique identifier, wherein the retrieved application identifier is used by the application manager to communicate with the first application.

12. The method of claim 8, wherein the first application is part of an application bundle downloaded from an application store over a network and installed within the operating system, and wherein the unique identifier is a bundle identifier that uniquely identifies the application bundle.

13. The method of claim 12, wherein the first application is provided by a first content provider, and wherein the first application is configured to render media content streamed from a content server associated with the first content provider to be presented to the display device.

14. The method of claim 12, wherein the application bundle includes the first application and a second application, wherein the request further includes a class identifier that identifies one of the first application and the second application, and wherein the first application is identified based on the unique identifier and the class identifier.

15. A data processing system, comprising:
a processor;
a memory; and
an application manager loaded in the memory and executed by the processor to perform a method of managing applications within the data processing system, the method including
receiving, at the application manager of an operating system, a request from a first daemon via a first application programming interface (API) to present a notification message to a user of the data processing system,
identifying by the application manager a first of a plurality of applications that have been installed within the operating system based on a unique identifier extracted from the request,
communicating, via a second API, with the first application to obtain a first view controller handle of a first view controller associated with the first application,
invoking, via the first view controller handle, the first view controller to display the notification message obtained from the request, wherein the first view controller is configured to display the notification message in a manner configured by the first application on a display device associated with the data processing system;
receiving by the application manager a callback via the second API with a first status from the first application indicating that the notification message has been displayed;
transmitting the first status to the first daemon via the first API; and
causing the view controller to be terminated.

16. The system of claim 15, wherein the method further comprises:
receiving by the application manager a user input from a second daemon associated with an input device of the data processing system, the user input indicating that a cancellation has been received from the user; and
transmitting a second status to the first daemon via the first API indicating that the notification message has been presented and the user has issued a cancellation.

17. The system of claim 15, wherein the method further comprises:
detecting by the application manager a predetermined period of time lapses during which no user input has been received; and
transmitting a third status to the first daemon via the first API indicating that the notification message has been presented and no user input has been received with respect to the presented notification message.

18. The system of claim 15, wherein identifying the first application from the plurality of applications comprises:
performing a lookup operation in an application registry based on the unique identifier, wherein the application registry includes a plurality of entries, each entry corresponding one of the plurality of applications that have been installed within the operating system; and retrieving an application identifier from one of the entries that matches the unique identifier, wherein the retrieved application identifier is used by the application manager to communicate with the first application.

19. The system of claim 15, wherein the first application is part of an application bundle downloaded from an application store over a network and installed within the operating system, and wherein the unique identifier is a bundle identifier that uniquely identifies the application bundle.

\* \* \* \* \*